(12) United States Patent
Le Gall et al.

(10) Patent No.: US 8,851,123 B2
(45) Date of Patent: Oct. 7, 2014

(54) SEALED STOPPER FOR AN OPENING IN A JUNCTION TUBING BETWEEN A HOUSING AND A PIPE, AND METHOD FOR IMPLEMENTING SAID STOPPER

(75) Inventors: Lionel Le Gall, Villeurbanne (FR); Pierre Chevalier, Lyons (FR); Jean-Claude Petit, Mouvaux (FR)

(73) Assignee: Areva NP, Courbevoie (FR)

( * ) Notice: Subject to any disclaimer, the term of this patent is extended or adjusted under 35 U.S.C. 154(b) by 714 days.

(21) Appl. No.: 13/144,455

(22) PCT Filed: Jan. 6, 2010

(86) PCT No.: PCT/FR2010/050010
§ 371 (c)(1),
(2), (4) Date: Jan. 20, 2012

(87) PCT Pub. No.: WO2010/081976
PCT Pub. Date: Jul. 22, 2010

(65) Prior Publication Data
US 2012/0103995 A1 May 3, 2012

(30) Foreign Application Priority Data

Jan. 14, 2009 (FR) .................................... 09 50177

(51) Int. Cl.
*F16L 55/10* (2006.01)
*G21C 13/06* (2006.01)
*F16L 55/115* (2006.01)
*F22B 37/22* (2006.01)

(52) U.S. Cl.
CPC ............. *F16L 55/1152* (2013.01); *G21C 13/06* (2013.01); *Y02E 30/40* (2013.01); *F22B 37/222* (2013.01)
USPC ............................... 138/89; 220/378; 220/327

(58) Field of Classification Search
CPC .............................. F16L 55/1152; G21C 13/06
USPC .................................. 138/89, 90; 220/378, 327
See application file for complete search history.

(56) References Cited

U.S. PATENT DOCUMENTS

| | | | | |
|---|---|---|---|---|
| 1,389,542 A * | 8/1921 | Wereley | .......................... | 220/327 |
| 2,426,800 A * | 9/1947 | Triplett | .......................... | 324/156 |
| 2,467,061 A * | 4/1949 | Mason | .......................... | 220/327 |
| 4,699,292 A * | 10/1987 | Farrell | .......................... | 220/812 |
| 4,934,715 A * | 6/1990 | Johnson | .......................... | 277/647 |
| 5,007,460 A * | 4/1991 | Zezza et al. | .......................... | 138/89 |
| 5,063,996 A * | 11/1991 | Kenner | .......................... | 166/75.11 |
| 5,238,054 A * | 8/1993 | Ritz et al. | .......................... | 165/71 |
| 5,331,674 A | 7/1994 | Evans et al. | | |
| 2012/0279965 A1 * | 11/2012 | Le Gall et al. | ................. | 220/233 |

FOREIGN PATENT DOCUMENTS

| | | |
|---|---|---|
| EP | 0170789 | 2/1986 |
| FR | 2700060 | 7/1994 |
| FR | 2708080 | 1/1995 |

* cited by examiner

*Primary Examiner* — Patrick F Brinson
(74) *Attorney, Agent, or Firm* — Davidson, Davidson & Kappel, LLC

(57) ABSTRACT

A sealed stopper for an opening in a junction tubing between an enclosure and a pipe, including an attachment ring. The stopper includes a rigid lid and a sealing assembly borne by the lid including a passive annular gasket including at least one annular internal chamber, a first static annular gasket, a second static annular gasket and a flat gasket ensuring the seal of the opening of the tubing.

12 Claims, 4 Drawing Sheets

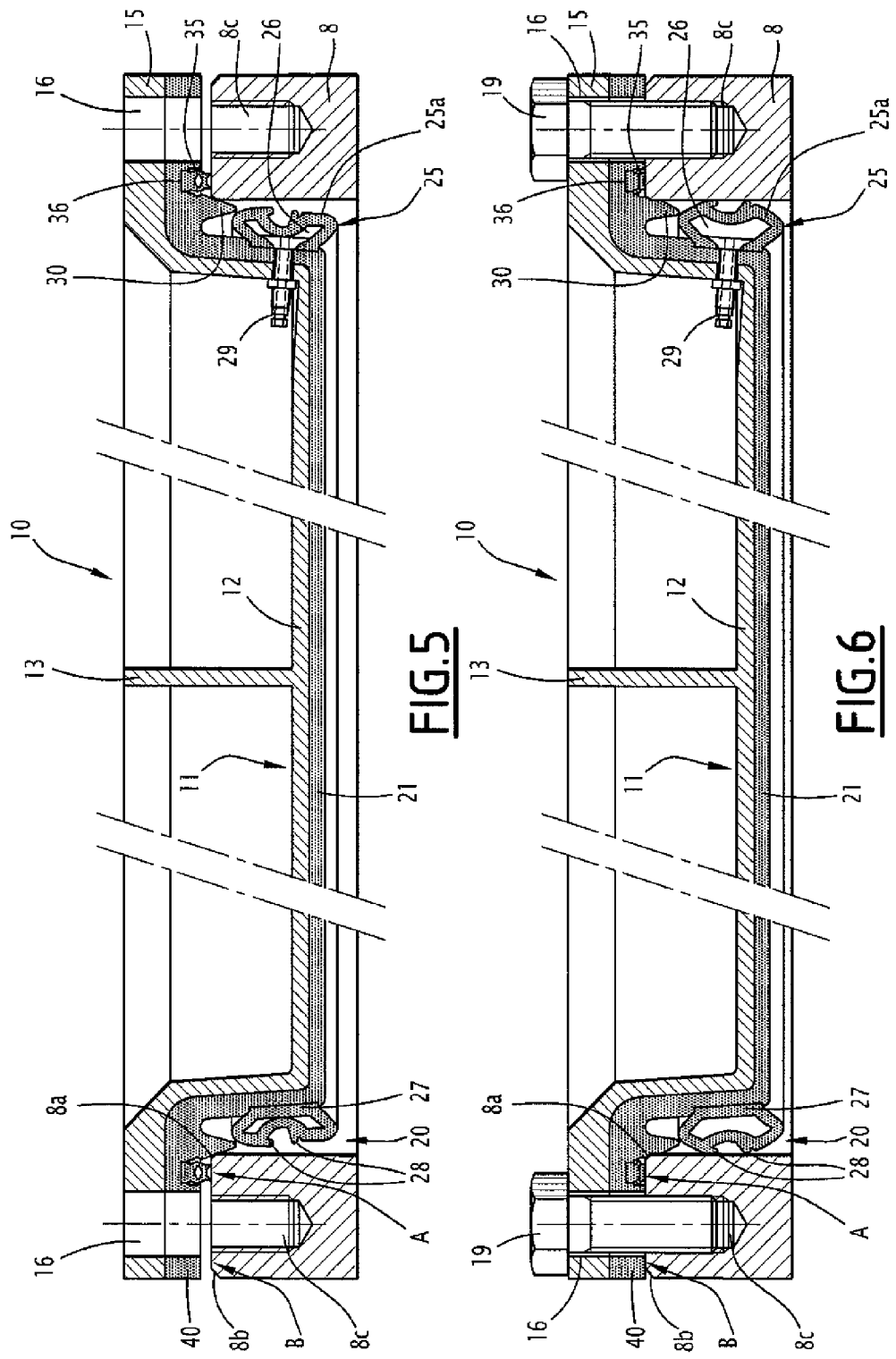

SEALED STOPPER FOR AN OPENING IN A JUNCTION TUBING BETWEEN A HOUSING AND A PIPE, AND METHOD FOR IMPLEMENTING SAID STOPPER

The present invention relates to a sealed stopper for an opening in a junction tubing between an enclosure and a pipe and more particularly for an opening of the tubing for connecting a water box of a steam generator of a pressurized water nuclear reactor to one side of the primary circuit.

The invention also relates to a method for sealing an opening in a junction tubing between an enclosure and a pipe by means of such a stopper.

BACKGROUND

Pressurized water nuclear reactors include steam generators which ensure supply water heating and vaporization by the heat conveyed by the pressurized water used for cooling the core of the reactor.

Pressurized water reactors include on each of their primary branches a steam generator having a primary portion in which the pressurized water circulates for cooling the reactor and a secondary portion receiving the supply water, which is heated and gradually vaporized and flows out of the secondary portion of the steam generator as steam which is sent to the turbine associated with the nuclear reactor in order to ensure driving of an alternator for producing electric current.

Such steam generators include an external shell, called a pressure shell of a general cylindrical shape with its axis vertical and firmly secured to a substantially horizontal tubular plate, the lower face or inlet face forms a wall of a water box for supplying pressurized water forming the primary fluid to the steam generator.

This water box of a generally hemispherical shape is crossed by openings at which tubings are welded for connection to the hot branch and to the cold branch of a loop of the primary circuit of the nuclear reactor.

Nuclear reactors have to be periodically shut down for carrying out maintenance, replacement and repair operations, such as the handling of fuel assemblies.

This downtime gives the possibility of also carrying out maintenance of the steam generators.

In order to carry out certain maintenance or repair operations on the steam generators, during the downtimes of the nuclear reactor, it may be necessary to have operational staff intervene inside the water box.

The primary circuit and the vessel of the nuclear reactor are filled with water during the maintenance operations of the nuclear reactor so that it is necessary to empty the water box and then isolate it from the primary circuit so that operators may intervene inside this water box.

In order to allow intervention of operators inside the water box, devices for sealing tubings joining this water box to the primary circuit, which include stoppers also called sealing plugs, are set into place inside the tubings of the water box prior to the interventions.

In order to set this stopper into place, an attachment ring of the stopper is welded inside the water box around the opening of the tubing in its portion opening out inside the enclosure in a coaxial arrangement with respect to the tubing.

The stopper also includes a sealing member, intended to be applied onto the inner surface of the attachment ring and/or of the opening of the tubing.

It is generally required that the stopper be made in several portions which are assembled inside the water box or in a foldable form insofar that the stopper has to be introduced into the water box through a manhole, the diameter of which is generally smaller than the diameter of the opening of the tubing in which the stopper is placed.

This type of stopper should meet design requirements related to the conditions of use, notably in terms of pressure, temperature and dosimetry for the operators.

Indeed, the stopper should be able to withstand a pressure of the order of 5 bars on the side of the primary circuit and a temperature which may attain 120° C. in the case of loss of cooling of the reactor.

In order to achieve maximum reduction of the dosimetry integrated by the operators, during interventions, the stopper should be able to be installed and removed during a short human intervention and be preferably screwed by tele-operation onto the attachment ring.

For this purpose, a stopper also called a sealing plug is known, consisting of three adjacent portions which, once assembled form a basin including a first cylindrical portion closed by a bottom, the diameter of which is smaller than the inner diameter of the ring, and a second peripheral portion with a flat annular shape, the outer diameter of which is greater than the inner diameter of the ring.

In this case, the seal is ensured by two inflatable peripheral annular gaskets which are inserted between the inner surface of the ring and the external surface of the cylindrical portion of the stopper, when this stopper is set into place, as well as by a static gasket which will either bear against the inner surface of the opening of the tubing, or against the upper surface of the ring, and a peripheral retaining portion in the form of a rim which will be applied against the upper surface of the attachment ring.

Maintaining the stopper in position is generally ensured by attachment members, such as for example screws, which cross the peripheral portion of the stopper and which are screwed into threaded orifices made in the ring.

The main drawback of this kind of stopper lies in the fact that it requires the gasket to be connected to an inflating unit and that it requires continuous monitoring of the inflation of the gaskets guaranteeing the seal.

Further, it was found that this kind of stopper has mechanical strength and in particular, resistance to temperature or to pressure of a fluid being exerted on one side of said stopper, which may be insufficient for repeated uses and for long durations, or for accidental situations.

SUMMARY OF THE INVENTION

An object of the invention is to avoid these drawbacks by providing a reliable sealed stopper for an opening in a junction tubing between an enclosure and a pipe and easy to apply by operators inside a water box of a steam generator, while reducing the intervention time of these operators in a hostile environment.

An object of the invention is to provide a sealed stopper for an opening in a junction tubing between an enclosure and a pipe, including an attachment ring arranged around this opening for connecting the tubing opening out into the enclosure and attached on the internal surface of said enclosure, said stopper comprising:

a rigid lid formed by a substantially cylindrical central portion, the diameter of which is smaller than the interior diameter of the attachment ring and a flat annular portion, the diameter of which is greater than the interior diameter of said attachment ring and provided with attachment members intended to be screwed into threaded orifices made on this ring, and a sealed assembly borne by said lid, characterized in that the sealed assembly comprises:

a passive annular gasket including at least one annular chamber and provided with at least one outer lip, said gasket being deformable between a retracted position by depressurizing said at least one chamber during the laying of the lid on the attachment ring, and a deployed sealing position in which said at least one lip is applied against the internal surface of the attachment ring.

a first static annular gasket capable of ensuring the seal against the internal surface and/or the upper internal angle of the attachment ring, a second static annular gasket capable of bearing upon an area of the upper surface of the attachment ring located between the internal rim and the threaded orifices of said ring during tightening of the screwing members of the lid, a flat annular gasket capable of bearing upon an area of the upper surface of the attachment ring located between the threaded orifices and the external rim of said ring, during the tightening of the screwing members of the lid.

According to other features of the invention:

the sealed assembly is firmly secured to a membrane attached on the lower face of the central portion of the lid, said at least annular chamber of the passive gasket is connected through at least one valve for connecting to a depressurization system, the second static annular gasket is of the single effect or dual effect type, the lid is in composite material or in metal alloy, such as aluminium for example, the lid is formed with at least two panels jointed with two panels hinged together and foldable on each other, the lid is formed with at least two independent panels.

An object of the invention is also to provide a method for hermetically sealing an opening in a junction tubing between an enclosure and a pipe by means of a stopper as defined earlier, characterized in that it consists of the following steps:

the lid bearing the sealed assembly is introduced into the inside of the enclosure through a manhole, the connecting valve of said at least one annular chamber of the passive gasket is connected to the depressurization system, the passive gasket is retracted by depressurizing said at least one annular chamber and is maintained in the retracted position, the stopper is positioned and installed on the attachment ring by placing the first static annular gasket against the internal surface of the attachment ring on the one hand and the second static annular gasket and the flat annular gasket onto the upper surface of said ring on the other hand, the stopper is attached on the attachment ring with the screwing members, and the depressurization of said at least one annular chamber of the passive gasket is stopped in order to deploy said gasket against the internal surface of the attachment ring and to hermetically seal the opening of the tubing.

According to other features of the method according to the invention:

the lid in the folded position is introduced into the enclosure, and said lid is deployed, the independent panels of the lid are introduced into the enclosure and said lid is deployed.

BRIEF DESCRIPTION OF THE DRAWINGS

The invention and its advantages will be better understood upon reading the description which follows, only given as an example and made with reference to the appended drawings, wherein:

FIG. 5 is a schematic sectional view in a vertical plane of the stopper during its placement on the attachment ring, and FIG. 6 is a schematic sectional view in a vertical plane of the stopper mounted on the attachment ring and attached around the opening for connecting the tubing of the enclosure.

DETAILED DESCRIPTION

Figure 1:
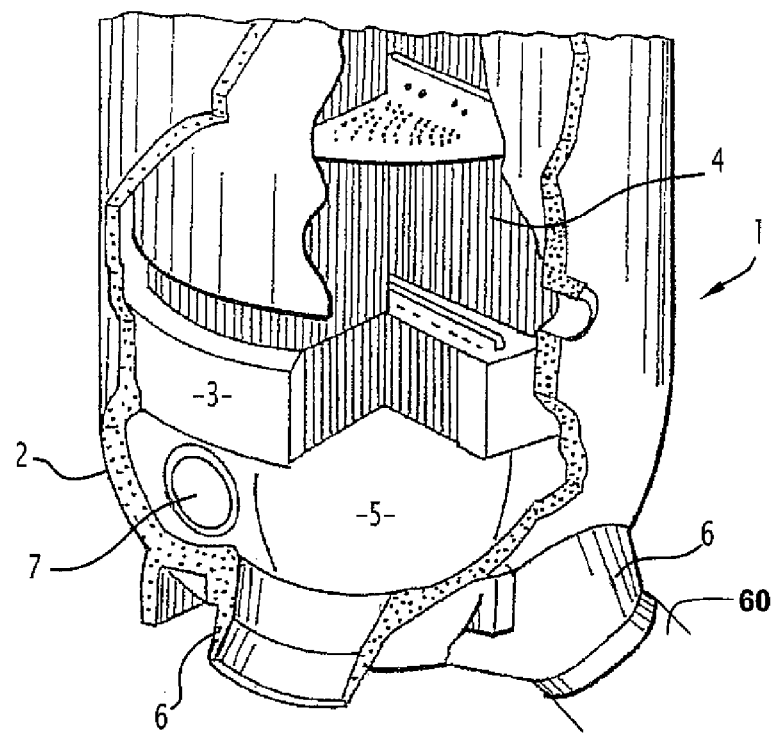
FIG. 1 is an exploded perspective view of the lower portion of a steam generator with its water box.

In FIG. 1, the lower portion of a steam generator is illustrated, designated by the general reference 1, and including the hemispherical wall of a water box 2. This hemispherical wall is welded on a tubular plate 3, in which the ends of the tubes of the manifold 4 are attached. The water box 2 is interiorly divided into two portions by a transverse partition 5.

On either side of the partition 5, the wall of the water box 2 is crossed by openings at which are attached tubings 6 for connecting together two pipes of the primary circuit, one of which is shown schematically as 60.

With the tubings 6, it is possible to ensure supply of pressurized water to one of the portions of the water box and recovery by the other portion of the water box of the pressurized water having circulated inside the tubes of the manifold 4 of the steam generator 1.

Figure 2:
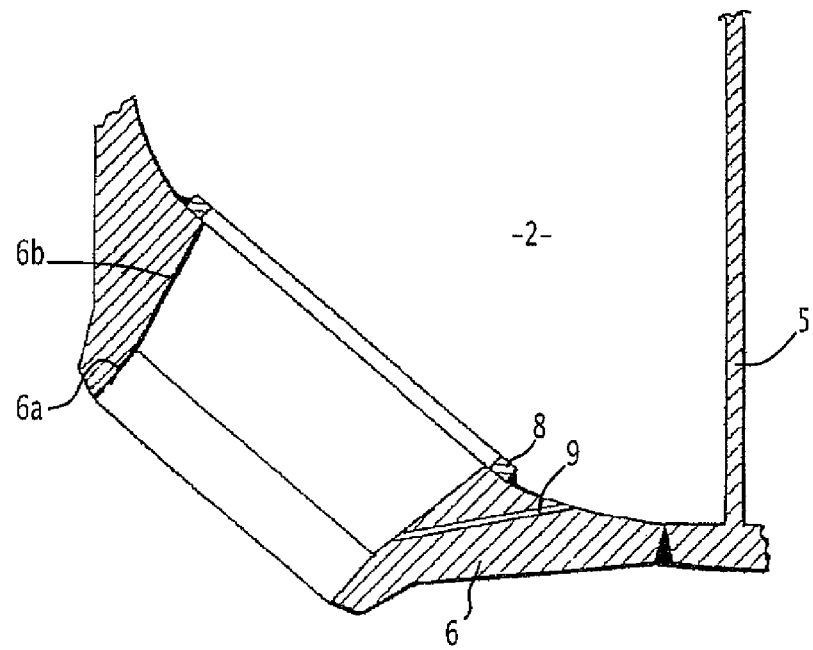
FIG. 2 is a sectional view of a tubing of the water box of a steam generator, including an attachment ring for a stopper, according to the invention

The wall of the water box 2 is also crossed by manholes 7 opening out into each of the compartments separated by the partition 5. As this is visible in FIG. 2, the tubings 6 attached at the openings of the crossing of the water box 2 include a bore of a cylinder-tapered shape including a first cylindrical portion 6a extended with a second tapered portion 6b, which is flared towards the inside of the water box 2.

In order to carry out an intervention inside the water box 2, it may be necessary to have operators penetrate through the manholes 7 into the inside of either one of the compartments of the water box 2 separated by the partition 5, while the primary circuit has to be maintained full of water. In order to allow such interventions under such conditions, the primary circuit has to be temporarily emptied beforehand for installing stoppers of the primary tubings of the steam generator and the function of which is to generate a sealed barrier between the primary circuit and the inside of the water box of the steam generator. The primary circuit may then be again filled with water, as soon as the installation of the stoppers of primary tubings in the water box of the steam generator is finished.

For this purpose, an attachment ring 8 is attached, for example, by welding onto the interior surface of the water box 2, in a coaxial arrangement with respect to the opening of the tubing 6 in the area where the flared portion of the tubing 6 opens out inside the water box 2.

The tubing 6 is also pierced with a channel 9 through which the water box may be completely emptied.

A stopper illustrated as a whole in FIGS. 3 to 6 has to be introduced into the inside of the water box 2 through the manhole 7 opening out into said water box.

Figure 3:
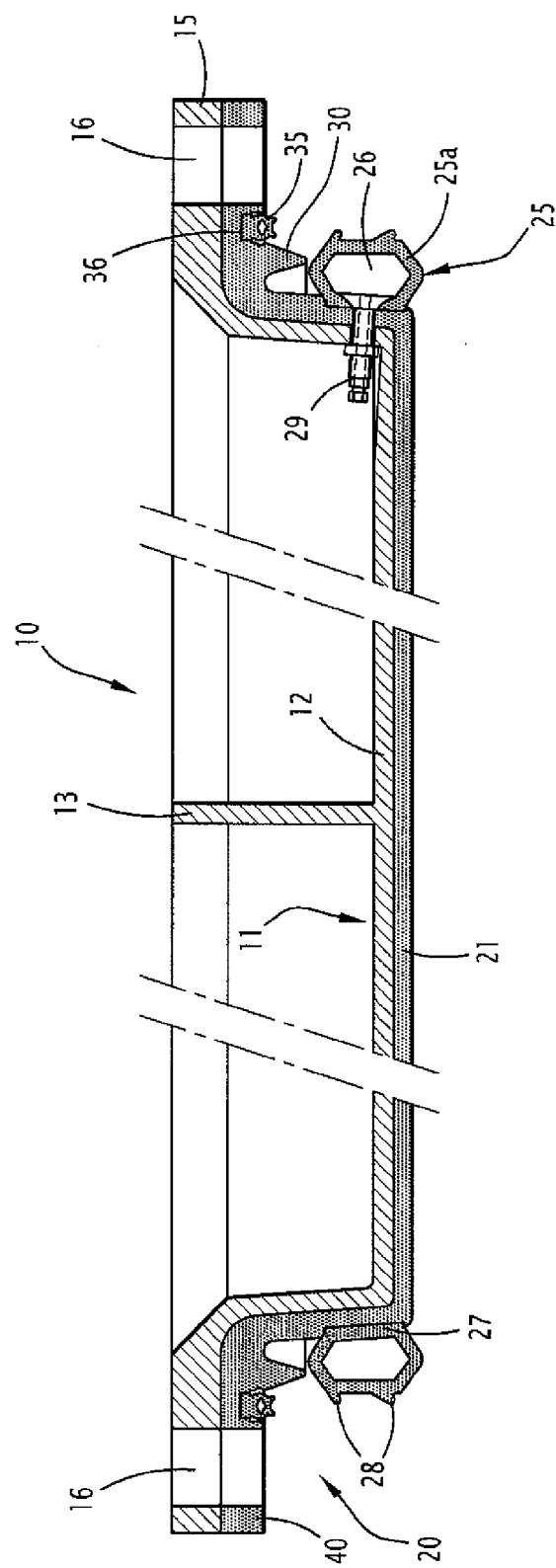
FIG. 3 is a schematic sectional view in a vertical median plane of a stopper, according to the invention.
Figure 4:
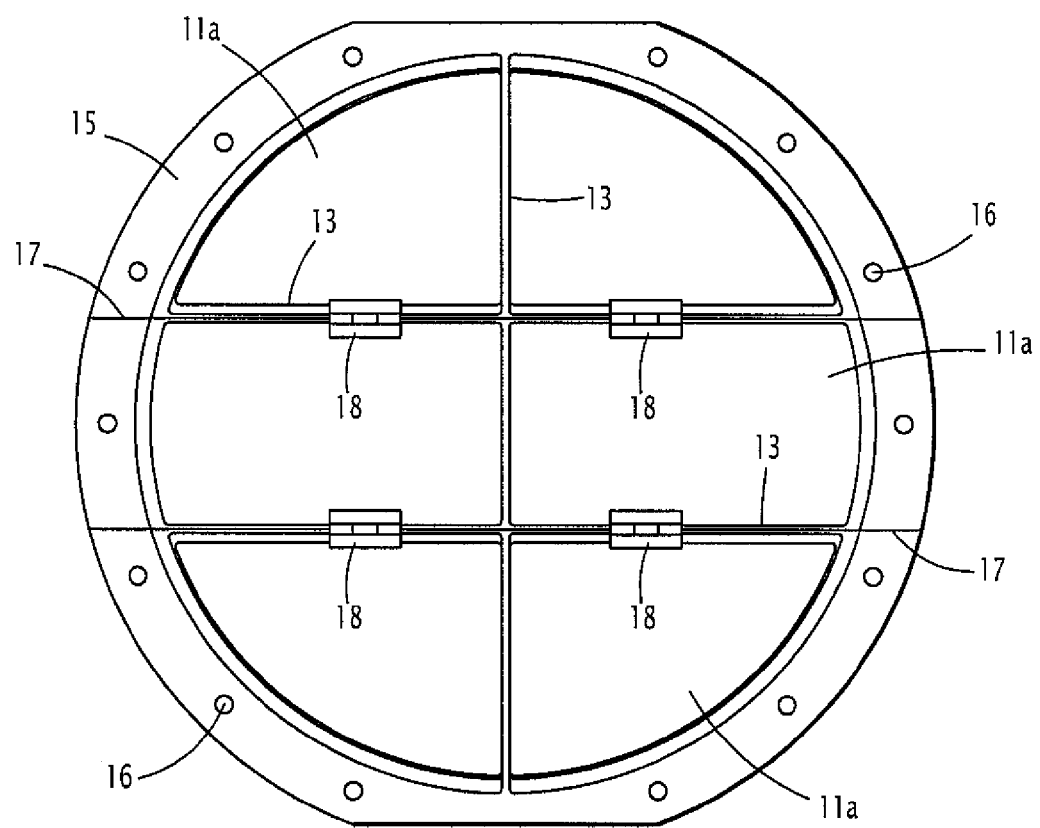
FIG. 4 is a schematic top view of the stopper, according to the invention.

This stopper designated as a whole by reference 10 comprises a rigid lid 11 formed by a substantially cylindrical central portion 12 and in the form of a basin (FIG. 3.). This basin-shaped central portion 12 is reinforced by ribs 13 (FIG. 4). The diameter of the central portion 12 is smaller than the inner diameter of the attachment ring 8.

The lid 11 also includes a flat annular disc-shaped portion 15, the diameter of which is greater than the inner diameter of the attachment ring 8.

Preferably, the diameter of the flat annular portion 15 is substantially equal to the outer diameter of this attachment ring 8. This portion 15 includes orifices 16 for letting through attachment members 19 (FIG. 6), such as for example screwing members, cooperating with threaded orifices 8c made in said attachment ring 8.

The lid 11 is in composite material or in a metal alloy, like for example, aluminium, ensuring sufficient rigidity so that this lid withstands the water pressure in the primary circuit, which is of the order of a few bars.

In order to meet mass and passage congestion constraints of the stopper 10 in the manhole 7, the lid 11 is therefore made in a lightweight material and in at least two panels hinged together and foldable on each other.

In the exemplary embodiment illustrated in the figures and more particularly in FIG. 4, the lid 11 is formed with three juxtaposed panels 11a separated from each other by folding lines 17.

The panels 11a are hinged together by means of hinges 18, of a known type or by means of any other suitable system.

The stopper 10 also comprises a sealing assembly designated by the general reference 20 and borne by said lid 11.

Preferably, the sealing assembly 20 is firmly secured to the central portion 12 of the lid 11.

For this purpose, the lower face of this lid 11 is used as a support for a membrane 21 having a role in the sealing function between the primary circuit and the inside of the water box 2. The membrane 21 is part of the sealing assembly 20, as this will be seen later on. It is attached on the lower face of the lid 11 by any suitable means, such as for example screws.

As more particularly illustrated in FIGS. 3 and 5, the sealing assembly 20 consists of four elements, i.e.:

a passive annular gasket 25,
a first static annular gasket 30,
a second static annular gasket 35, and
a flat annular gasket 40.

The passive annular gasket 25 is formed by a shell 25a at least delimiting an annular chamber 26. The shell 25a includes on its internal side face a heel 27 for attachment on the membrane 21 and on its external side face, at least one outer lip 28 and, preferably, two outer lips 28, intended to be applied against the internal surface of the attachment ring 8, as this will be seen later on.

In the exemplary embodiment illustrated in the figures, the passive annular gasket 25 includes an annular chamber 26 which is connected through at least one connecting valve 29 to a depressurization system, allowing the external diameter of this passive annular gasket 25 to be changed between a retracted position by depressurizing the chamber 26 upon laying the lid 11 onto the attachment ring 8, as shown in FIG. 5, and a deployed sealing position in which the lips 28 are applied against the internal surface of the attachment ring 8, as shown in FIG. 6.

The chamber 26 has to be depressurized and therefore retracted in order to allow the lid 11 to be laid on the attachment ring 8.

After attaching this lid 11, setting the pressure of the chamber 26 to atmospheric pressure corresponds to the deployed sealing position of the gasket 25.

The first static annular gasket 30 is formed by a lip directly molded with the membrane 21, and which is capable of ensuring the seal against the internal surface or the upper internal angle of the attachment ring 8 in order to form a barrier against pressure and vacuum pressure.

In the exemplary embodiment illustrated in the figures, the lip of the first annular gasket 30 has a triangle-shaped section, the base of which has an outer diameter greater than the inner diameter of the attachment ring 8 so that it will be flattened against said internal surface after tightening the screwing members 19 of the lid 10. The lip of this first annular gasket 30 acts as a plug.

The second static gasket 35 of the single effect or dual effect type is mounted in a housing 36 made in the membrane 21. This second static gasket is intended to bear upon an area (FIG. 5) of the upper surface of the attachment ring 8, located between the internal rim 8a and the threaded orifices 8c of said attachment ring 8.

The flat annular gasket 40 is made together with the membrane 21 in the same material and is intended to bear upon an area B (FIG. 5) of the upper surface of the attachment ring 8, located between the threaded orifices 8c and the external rim 8b of the attachment ring 8.

According to an alternative, the lid 11 is formed with at least two juxtaposed independent panels via assembling rims for example. One of the panels bears the sealing assembly 20.

The laying of the stopper 10 into the opening of the tubing 6 of the water box 2 is carried out in the following way.

First of all, an operator penetrates into the corresponding compartment of the water box 2 and introduces into this compartment the lid 11 bearing the sealing assembly 20, in a folded configuration. In this configuration, the lid 11 may pass through into the manhole 7, which has a smaller inner diameter than the diameter of the lid 11 when it is deployed.

The lid 11 bears screwing members 19 intended to attach the stopper 10 to the attachment ring 8.

The operator then proceeds with deploying the lid 11, and connects the valve 29 for connecting the chamber 26 of the passive gasket 25 to the depressurization system.

Thus, by depressurization of this chamber 26, the passive gasket 25 is retracted as illustrated in FIG. 5 and this depressurization is maintained in order to keep the passive gasket 25 in the retracted position.

Next, the operator lays the lid 10 into the opening of the tubing 6, the passive gasket 25 in the retracted position will be housed in the inside of the attachment ring 8, as shown in FIG. 5.

Also, the first static gasket 30 will bear against the internal rim 8a of the attachment ring 8 and the second static annular gasket 35 will bear upon the area A of this attachment ring 8.

The operator proceeds with attaching the stopper 10 onto the attachment ring 8 by screwing the screwing members 19.

Under the effect of the force exerted by the screwing members 19, the first static annular gasket 30 penetrates more deeply inside the attachment ring 8 and ensures a barrier against pressure and vacuum pressure. The second static annular gasket 35 is also flattened against the area A of the attachment ring 8 and ensures a role of limiting possible leaks from the portion to be sealed or from accidental pressurization above the stopper 10. The flat annular gasket 40 comes into contact with the area B of the attachment ring 8 and ensures a standard seal by screwing the whole of the screwing members 19.

The operator stops the depressurization of the chamber 26 of the passive gasket 25 in order to deploy said gasket 25 against the internal surface of the attachment ring 8 and thereby sealing the opening of the tubing.

In the case when the lid 11 consists of at least two independent panels, these panels are separately introduced into the compartment of the water box 2 through the corresponding manhole, and then assembled so as to deploy said lid.

The stopper 10 according to the invention therefore gives the possibility of ensuring a very good sealed contact on the attachment ring and this stopper has increased resistance to pressure regardless of the direction in which this pressure is exerted.

The stopper according to the invention has the advantage of being resistant and lightweight facilitating handling operations and is easy to set into place, which reduces the intervention time of these operators in a hostile environment.

What is claimed is:

1. A sealed stopper for an opening in a junction tubing between an enclosure and a pipe, an attachment ring being positioned around the opening and attached onto an internal surface of the enclosure, the stopper comprising:
    a rigid lid formed by a substantially cylindrical central portion and a flat annular portion, a diameter of the central portion being smaller than an inner diameter of the attachment ring, the diameter of the annular portion being greater than the inner diameter of the attachment ring and provided with attachment members intended to be screwed into threaded orifices on the attachment ring, and
    a sealing assembly borne by the lid,
        wherein the sealing assembly comprises:
        a passive annular gasket including at least one annular chamber and provided with at least one outer lip, the gasket being deformable between a retracted position by depressurization of the at least one annular chamber during laying of the lid on the attachment ring and a deployed sealing position in which the at least one lip is applied against an internal surface of the attachment ring,
        a first static annular gasket capable of ensuring a seal between the internal surface and/or an upper internal angle of the attachment ring,
        a second static annular gasket capable of bearing upon an area of an upper surface of the attachment ring located between an internal rim and the threaded orifices of the attachment ring, during tightening of the attachment members of the lid, and
        a flat annular gasket capable of bearing upon an area of the upper surface of the attachment ring located between the threaded orifices and an external rim of the attachment ring, during tightening of the attachment members of the lid.

2. The stopper according to claim 1, wherein the sealing assembly is firmly secured to a fixed membrane on a lower face of the central portion of the lid.

3. The stopper according to claim 1, wherein the at least one annular chamber of the passive gasket is connected through at least one valve for connecting to a depressurization system.

4. The stopper according to claim 1, wherein the second static annular gasket is of a single effect or dual effect type.

5. The stopper according to claim 1, wherein the lid is made of a composite material or a metal alloy.

6. The stopper according to claim 1, wherein the lid is formed with at least two panels hinged together and foldable on each other.

7. The stopper according to claim 1, wherein the lid is formed with at least two independent panels.

8. A method for sealing an opening of a junction tubing between an enclosure and a pipe by a stopper according to claim 1, the method comprising the following steps:
    introducing the lid bearing a sealing assembly into an inside of the enclosure through a manhole;
    connecting a connecting valve of at least one chamber of a passive gasket to a depressurization system;
    retracting a passive gasket by depressurizing the at least one annular chamber and maintaining the passive gasket in the retracted position;
    positioning and installing the stopper on the attachment ring by placing a first static annular gasket against an internal surface of the attachment ring and a second static annular gasket and a flat annular gasket on an upper surface of the ring;
    attaching the stopper onto the attachment ring with attachment members; and
    stopping the depressurization of the at least one annular chamber of the passive gasket for deploying the passive gasket against the internal surface of the attachment ring and for hermetically sealing the opening of the tubing.

9. The method according to claim 8, wherein the lid is introduced in a folded position into the enclosure, and the lid is deployed.

10. The method according to claim 8, wherein the lid is introduced in independent panels into the enclosure, and the lid is deployed.

11. The use of a sealed stopper according to claim 1, for sealing an opening of a junction tubing between a water box of a steam generator and a pipe of a primary circuit of a pressurized water nuclear reactor.

12. The stopper according to claim 5, wherein the lid is made of aluminum.

* * * * *